US012451610B2

(12) United States Patent
Zhang et al.

(10) Patent No.: US 12,451,610 B2
(45) Date of Patent: Oct. 21, 2025

(54) ANTENNA FILTER UNIT AND BASE STATION HAVING THE SAME

(71) Applicant: Telefonaktiebolaget LM Ericsson (publ), Stockholm (SE)

(72) Inventors: Xueyuan Zhang, Beijing (CN); Bingjian Niu, Beijing (CN); Mengyang Jia, Beijing (CN); Yang Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 141 days.

(21) Appl. No.: 18/262,065

(22) PCT Filed: Feb. 20, 2021

(86) PCT No.: PCT/CN2021/077052
§ 371 (c)(1),
(2) Date: Jul. 19, 2023

(87) PCT Pub. No.: WO2022/174416
PCT Pub. Date: Aug. 25, 2022

(65) Prior Publication Data

US 2024/0128650 A1 Apr. 18, 2024

(51) Int. Cl.
*H01Q 13/10* (2006.01)
*H01Q 1/24* (2006.01)
*H01P 1/205* (2006.01)

(52) U.S. Cl.
CPC ............. *H01Q 13/10* (2013.01); *H01Q 1/246* (2013.01); *H01P 1/2056* (2013.01)

(58) Field of Classification Search
CPC .......... H01Q 1/24; H01Q 1/246; H01Q 13/10; H01Q 13/18; H01Q 21/005
See application file for complete search history.

(56) References Cited

U.S. PATENT DOCUMENTS

| | | | | |
|---|---|---|---|---|
| 4,714,903 | A | 12/1987 | Brand | |
| 6,542,050 | B1 | 4/2003 | Arai et al. | |
| 2001/0010507 | A1 | 8/2001 | Hiroshima et al. | |
| 2009/0295504 | A1 | 12/2009 | Andreasson | |
| 2012/0293279 | A1* | 11/2012 | Gong | H01Q 9/32 333/202 |
| 2020/0153108 | A1* | 5/2020 | Uemichi | H01Q 13/106 |

FOREIGN PATENT DOCUMENTS

| | | | |
|---|---|---|---|
| CN | 1252632 | A | 5/2000 |
| CN | 101533939 | A | 9/2009 |
| CN | 104638360 | A | 5/2015 |
| CN | 109509945 | A | 3/2019 |
| WO | 2008033067 | A1 | 3/2008 |
| WO | 2019130305 | A1 | 7/2019 |

* cited by examiner

*Primary Examiner* — Hoang V Nguyen
(74) *Attorney, Agent, or Firm* — Murphy, Bilak & Homiller, PLLC

(57) ABSTRACT

An antenna filter unit and a base station having the antenna filter unit are disclosed. The antenna filter unit according to an embodiment comprises a dielectric body that defines a plurality of single-mode resonators each including a tuning hole. At least one slot is formed on a surface of the dielectric body to serve as an antenna radiator. The at least one slot is coupled to at least one of the resonators.

12 Claims, 10 Drawing Sheets

ANTENNA FILTER UNIT AND BASE STATION HAVING THE SAME

TECHNICAL FIELD

The present disclosure generally relates to the technical field of communication device, and more particularly, to an antenna filter unit (AFU) and a base station (BS) having the AFU.

BACKGROUND

This section introduces aspects that may facilitate better understanding of the present disclosure. Accordingly, the statements of this section are to be read in this light and are not to be understood as admissions about what is in the prior art or what is not in the prior art.

BS is an important part of a mobile communication system, and may include a radio unit (RU) and an antenna unit (AU). In traditional BS solution, remote radio unit (RRU) and AU are separated as two independent units and hung on high constructions, like tall buildings, high walls, towers and lamp stands. Considering the installation/fixation/occupation, smaller volume and lighter weight is always an important evolution direction in BS design, including Legacy BS, Street Macro, Micro, Small Cell, and Advanced Antenna System (AAS).

In recent years, with the development of the 5th Generation (5G) communication, Multiple-Input and Multiple-Output (MIMO) technology is widely used, in which the demands for small size high performance radio are growing rapidly. Moreover, volume/size is always related to power and Passive Inter-Modulation (PIM) performance. The study of how to get better performance in limited size or how to get enough performance in minimum size becomes more and more important.

Methods for reducing the size of products such as BS may include: 1) reducing the size of each component to its minimum; and 2) designing a high-integrated module in which multiple components are integrated into a single module. For example, an AU may be integrated with an RRU to form an Active Antenna Unit (AAU). Current 5G advance radio requires miniaturizing the whole unit size as much as possible. Reducing the size of each component and integrating AU with RU cannot meet the custom request for size and performance. Accordingly, a highly integrated AFU solution has been developed, in which an AU is integrated with a filter unit (FU).

In the existing AFU solutions, traditional two-piece or three-piece RF connectors usually have large assembly space (board-to-board distance), which is a bottle neck for whole distance reduction between filter and antenna. Moreover, multiple components, such as power divider, phase shifter, matching network, antenna isolator, and antenna reflector, need to be assembled together by a large number of metal screws and plastic screws, and a large quantity of soldering process is needed.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide a new AFU solution, which can benefit not only in volume and weight, but also in cost and production efficiency.

According to a first aspect of the disclosure, there is provided an AFU which comprises a dielectric body that defines a plurality of single-mode resonators each including a tuning hole, wherein at least one slot is formed on a surface of the dielectric body to serve as an antenna radiator, and the at least one slot is coupled to at least one of the resonators.

In an embodiment of the disclosure, the dielectric body is substantially covered with conducting material forming a conducting layer, and the slot is formed by removing a part of the conducting layer on the surface of the dielectric body.

In an embodiment of the disclosure, the dielectric body comprises a top layer and a bottom layer with a coupling window therebetween, the at least one of the resonators and the at least one slot are arranged at the top layer of the dielectric body, and an input or output resonator is arranged at the bottom layer.

In an embodiment of the disclosure, the input or output resonator serves as an impedance transformer.

In an embodiment of the disclosure, there is a cross-coupling between two of the plurality of single-mode resonators, which plays the role of a power divider and a phase shifter.

In an embodiment of the disclosure, the at least one slot comprises two or more slots forming an antenna array.

In an embodiment of the disclosure, at least one of the plurality of single-mode resonators is coupled to two or more slots, and the coupling plays the role of a phase shifter.

In an embodiment of the disclosure, a first resonator and a second resonator are coupled to one or two slots of the at least one slot respectively, the first resonator and the second resonator are both coupled to a third resonator of the plurality of single-mode resonators, and the coupling of the first and second resonators to the third resonator plays the role of a power divider.

In an embodiment of the disclosure, the dielectric body is made of ceramic.

In an embodiment of the disclosure, the slot is in the shape of a rectangle, or has a generally "H", "I" or "⊔" shape.

According to a second aspect of the disclosure, there is provided a base station which comprises an AFU according to the first aspect, wherein the AFU is soldered on a radio board by surface mounting technology.

In an embodiment of the disclosure, the base station is a small cell base station, a Street Macro base station, a Street Micro base station, or an AAS base station.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

The embodiments of the present disclosure are described in detail with reference to the accompanying drawings. It should be understood that these embodiments are discussed only for the purpose of enabling those skilled in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. Those skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1:
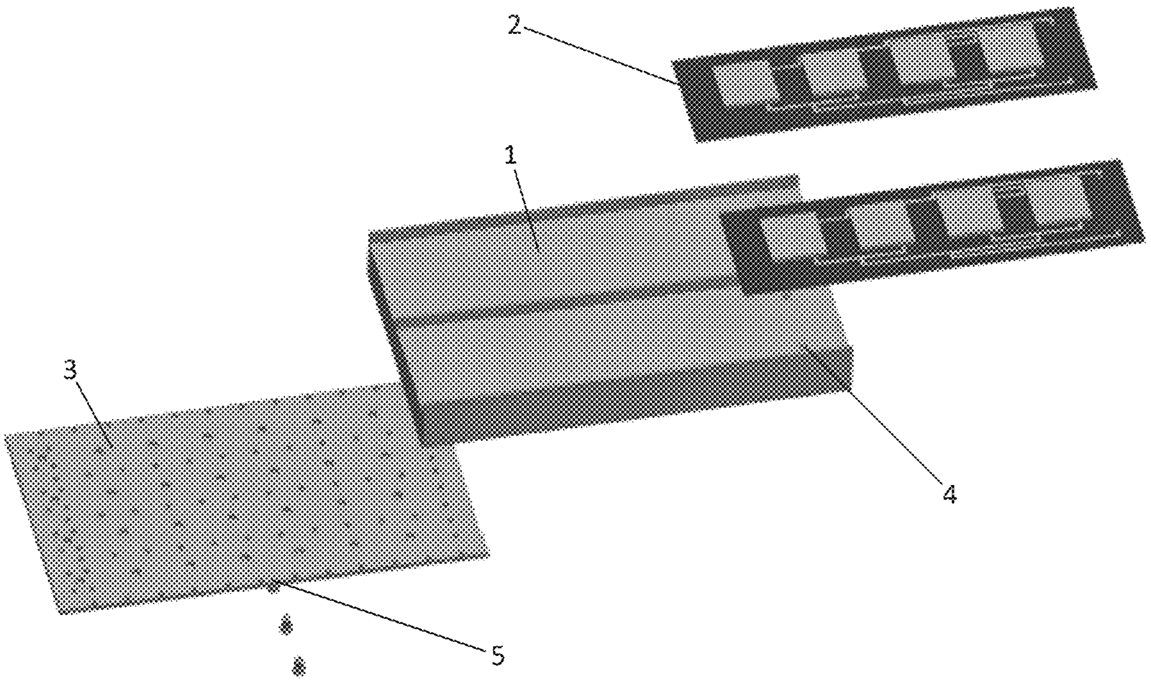
FIG. 1 is an explosive view of an existing AFU.
Figure 2:
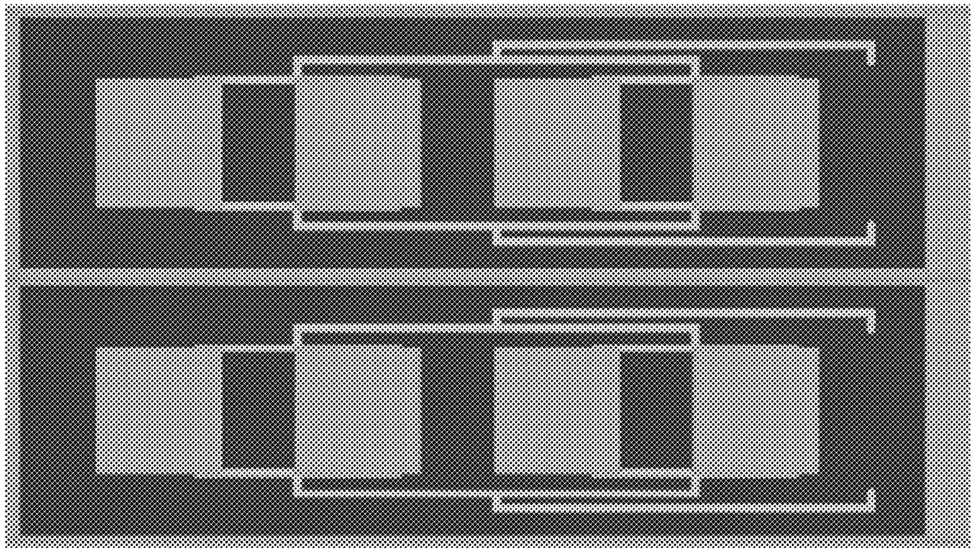
FIG. 2 is a top view of the existing AFU.
Figure 3:
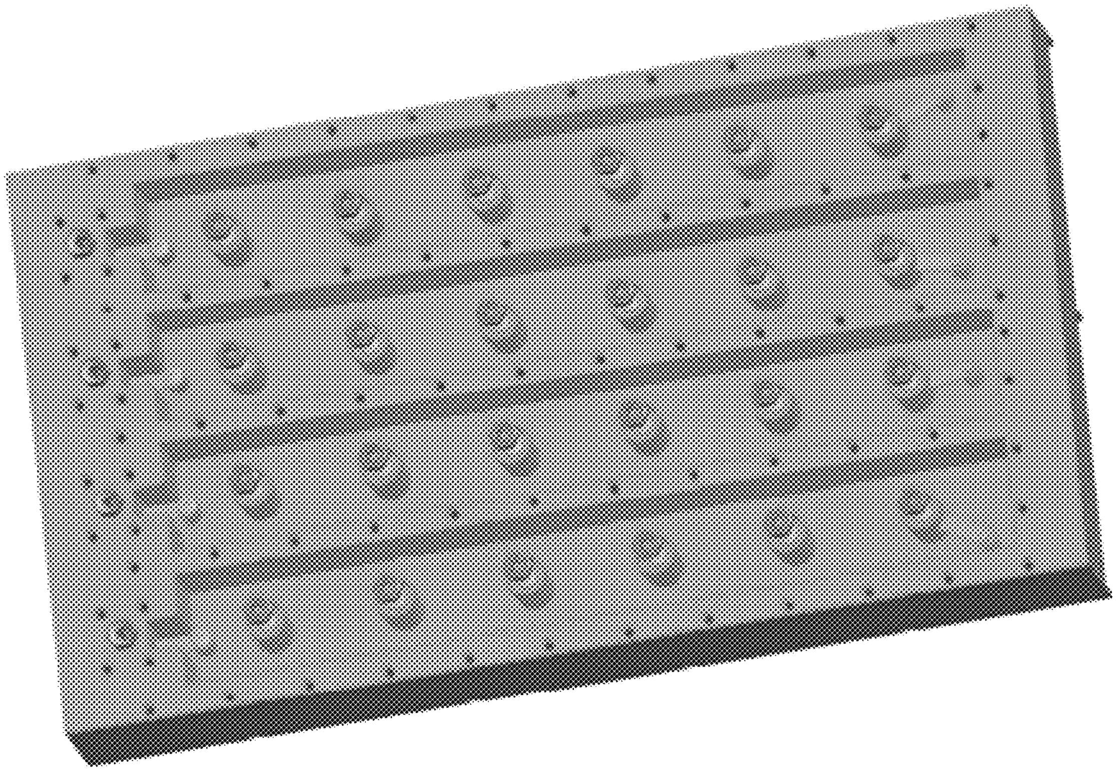
FIG. 3 is a bottom view of the existing AFU.
Figure 4:
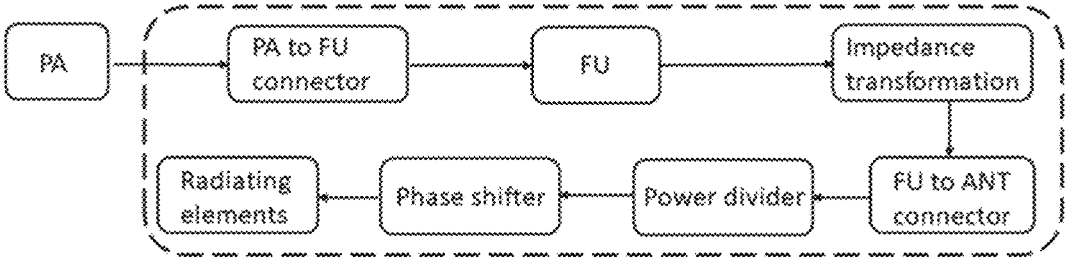
FIG. 4 is a schematic diagram of the existing AFU.
Figure 5A:
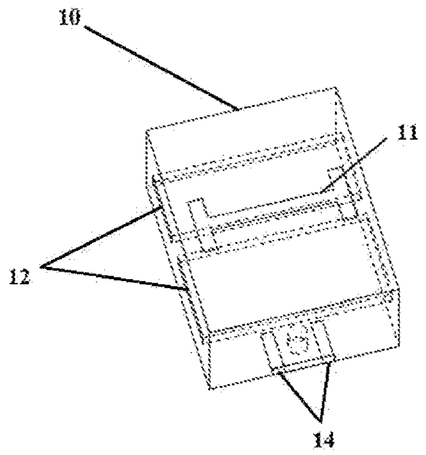
FIGS. 5A to 5D show a perspective view, a side view, a bottom view, and a top view, respectively, of an AFU according to a first embodiment of the disclosure.
Figure 5B:
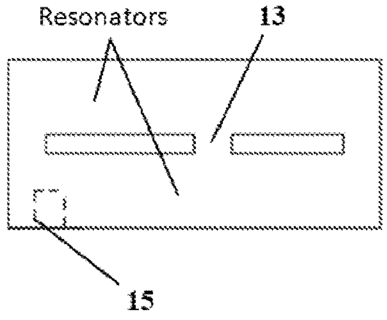
Figure 5C:
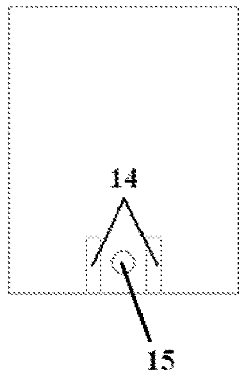
Figure 5D:
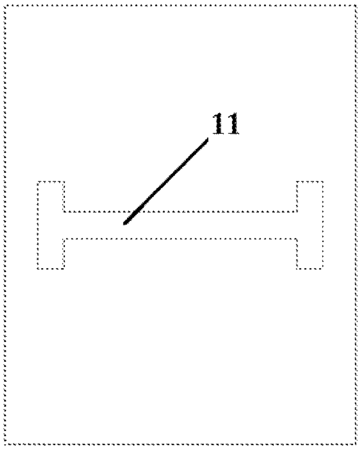

FIG. 1 is an explosive view of an existing antenna filter unit (AFU), FIG. 2 is a top view of the existing AFU, FIG. 3 is a bottom view of the existing AFU, and FIG. 4 is a schematic diagram of the existing AFU.

As shown in FIGS. 1 to 3, the existing AFU includes a cavity filter 1, an antenna board 2, and a filter cover 3. The cavity filter 1 is made of metal, and defines multiple cavities for housing resonance elements. The antenna board 2 is arranged on one side of the cavity filter 1, and is coupled to the cavity filter 1 via multiple connectors 4. The filter cover 3 is arranged on the other side of the cavity filter 1, and multiple connectors 5 are provided for connection with a radio board (not shown). Multiple radiating elements are provided on the antenna board 2 to form an array antenna. A feeding network including power dividers and phase shifters is also provided on the antenna board 2. At least a part of a surface of the cavity filter 1 may be used as a reflector for the radiating elements. An isolation bar for reducing the mutual coupling effect between the radiating elements may be provided on the surface of the cavity filter 1.

As shown in FIG. 4, in the existing AFU, for signal transmission between a power amplifier (PA) on the radio board and the cavity filter 1, a PA to FU connector (i.e., the connectors 5 shown in FIG. 1) is provided. Further, for signal transmission between the cavity filter 1 and the radiating elements on the antenna board 2, an impedance transformer, an FU to ANT connector (i.e., the connectors 4 shown in FIG. 1) and the feeding network including power dividers and phase shifters are provided. Accordingly, for assembling various parts to fulfill the filter function and the antenna function, a large number of metal screws and/or plastic screws are needed, and a quantity of soldering process is involved. In addition, since the cavity filter 1 is made of metal, the weight and size of the existing AFU is not competitive.

Figure 6A:
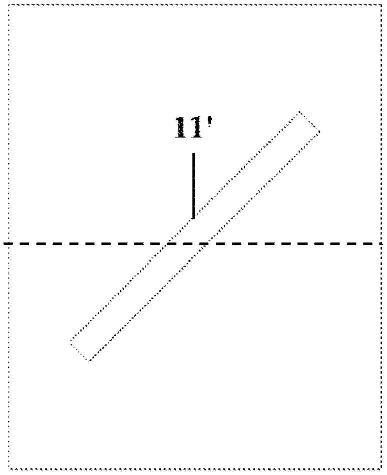
FIGS. 6A and 6B show two variations of the slot in the AFU.
Figure 6B:
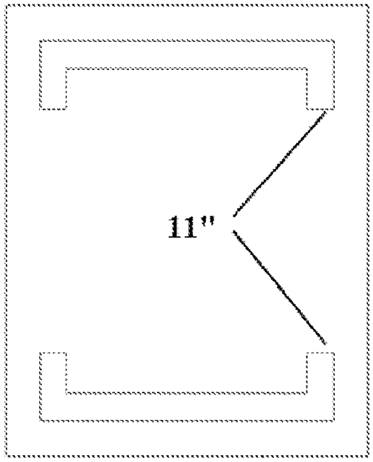
Figure 7:
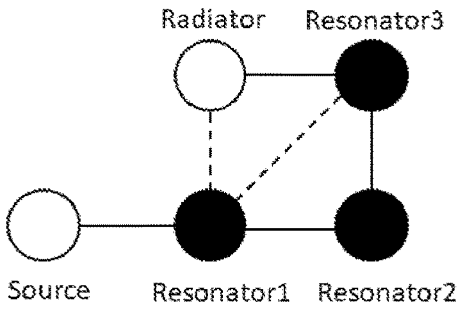
FIG. 7 shows a topology of the AFU according to the first embodiment.
Figure 8:
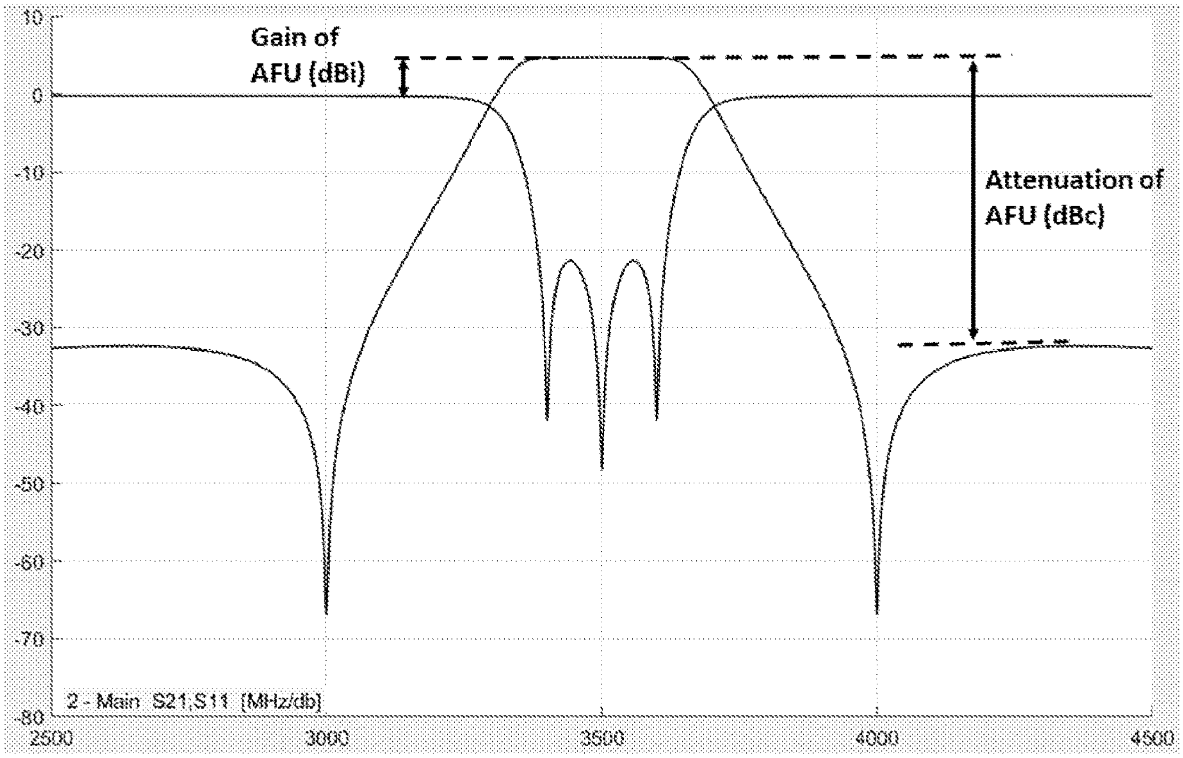
FIG. 8 shows a frequency response of the AFU according to the first embodiment.
Figure 9A:
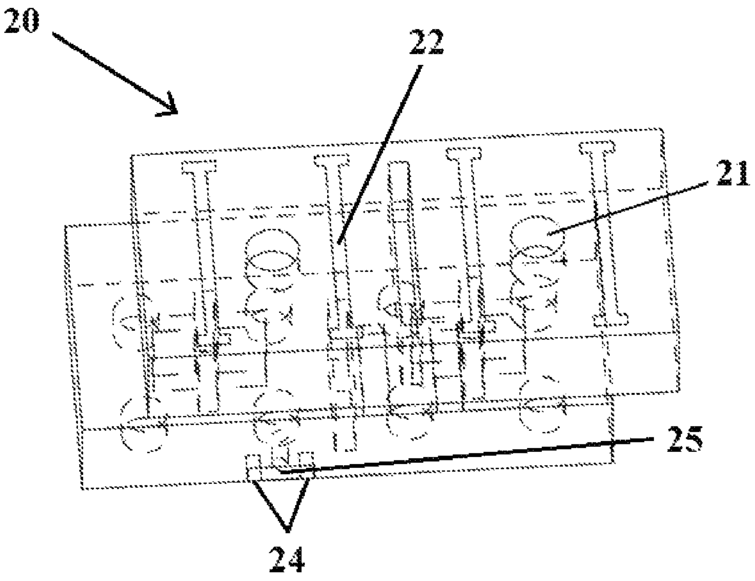
FIGS. 9A to 9D show a perspective view, a side view, a bottom view, and a top view, respectively, of an AFU according to a second embodiment of the disclosure.
Figure 9B:
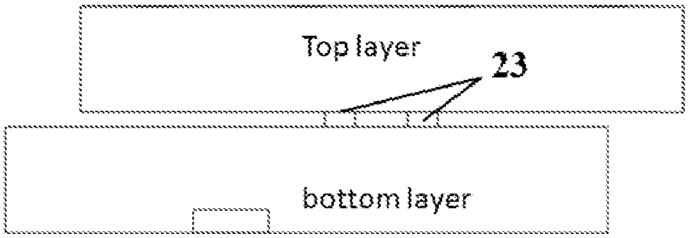
Figure 9C:
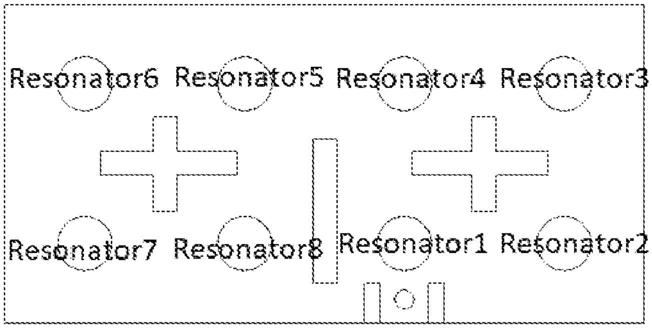
Figure 9D:
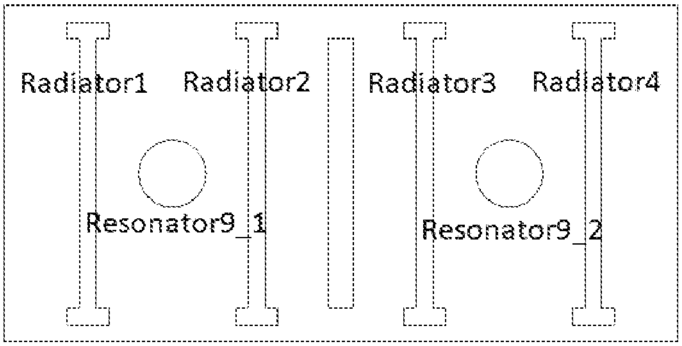

FIGS. 5A to 5D show a perspective view, a side view, a bottom view, and a top view, respectively, of an AFU according to a first embodiment of the disclosure. FIGS. 6A and 6B show two variations of the slot in the AFU. FIG. 7 shows a topology of the AFU, and FIG. 8 shows a frequency response of the AFU.

As shown in FIGS. 5A to 5D, the AFU according to the first embodiment comprises a dielectric body 10, which is in the form of a monoblock of ceramic, for example. It should be noted that the dielectric body 10 may be made of another dielectric material having a high permittivity. The dielectric body 10 in this embodiment generally has the shape of a parallelepipedon. The surfaces of the dielectric body 10 are covered with a conducting layer. The conducting layer may be a metalized layer that is formed by, for example, electroplating metal on the surfaces of the dielectric body 10. The metal may be silver, or may be another metal that satisfies a specific requirement.

The dielectric body 10 in this embodiment defines three single-mode resonators or resonating cavities, i.e., Resonator1, Resonator2 and Resonator3 as shown in FIG. 7. Each of the resonators includes a blind hole (not shown). The blind hole may have a circular cross section, or may be in the shape of a rectangle, an ellipse, or any other appropriate shapes in the cross section. The blind hole is also provided with a conducting layer which, for example, is formed by electroplating metal on the bottom surface and the wall surface of the blind hole. As will be appreciated by those skilled in the art, the blind hole can be used to tune a resonating frequency of a corresponding resonator.

A slot 11 is formed on a top surface of the dielectric body 10 to serve as an antenna radiator. The slot 11 is formed or etched by removing a part of the conducting layer on the top surface of the dielectric body 10. In this embodiment, only one slot 11 is provided, which is composed of a long stub parallel to a side surface of the dielectric body 10 and two short stubs perpendicular to the long stub. The slot 11 is generally in the shape of "I". However, the disclosure is not limited to this. For example, it will be readily conceivable that the slot 11 may be generally in the shape of "H" composed of a short stub and two long stubs.

FIG. 6A shows another form of slot 11', which is in the shape of a rectangle. The slot 11' is oblique with respect to a side surface of the dielectric body 10. FIG. 6B shows two slots 11" each having a generally "⊔" shape, so that a slot array or an antenna array is formed. The number, shape or form, position or location, and orientation of the slot can be set by those skilled in the art as needed.

The dielectric body 10 includes two layers, i.e., a top layer and a bottom layer. For example, the Resonator1 and the Resonator2 are arranged at the bottom layer, and the Resonator3 and the slot 11 (the Radiator in FIG. 7) are arranged at the top layer. At the interface between the top layer and the bottom layer, two through channels 12 penetrates through the dielectric body 10 from a side surface to another opposite side surface thereof. An interconnection part between the two through channels 12 serves as a coupling window 13 for the top layer and the bottom layer. At the bottom layer, the Resonator1 is coupled to the Resonator2. At the top layer, the Resonator3 is coupled to the slot 11 (the Radiator). Further, by means of the coupling window 13, the Resonator 2 at the bottom layer is coupled to the Resonator3 at the top layer, and the Resonator1 at the bottom layer is coupled to both the Resonator3 and the slot 11 (the Radiator) at the top layer.

The dielectric body 10 is soldered on a radio board (not shown) by surface mounting technology (SMT). For this purpose, a silver clearness 14 is provided on the bottom surface of the dielectric body 10. Further, a conductor pin 15 is provided for connection between the Resonator1 and a PA on the radio board. The conductor pin 15 and the Resonator1 can serve as an impedance transformer, so that impedance matching can be easily achieved.

From the above, it can be seen that in the AFU integrating a filter function and an antenna function achieved by the dielectric body 10, traditional two-piece or three-piece RF connectors between the filter unit and the antenna unit are dispensed with. The radio board may be used as an antenna reflector. For the antenna function, it should be noted that the slot 11 serving as the antenna radiator can be used either to radiate energy from the Resonator3 into the free space, or to receive energy from the free space and transmit it to the Resonator3. In other words, either a transmission antenna or a receiving antenna can be achieved by the slot 11. Accordingly, for the filter function, the Resonator1 connected to the conductor pin 15 can be used as either an input resonator or an output resonator.

FIG. 7 shows a topology of the AFU according to the first embodiment in case of a transmission antenna. The solid line denotes the main coupling, i.e., a positive/inductive coupling, between the Resonator1 and the Resonator2, or between the Resonator2 and the Resonator3, or between the Resonator3 and the Radiator formed by the slot 11, or between the Source on the radio board and the Resonator1 as the input resonator. The dashed line denotes the cross-coupling to generate transmission zeros, i.e., a negative/capacitive coupling between the Resonator1 and the Resonator3 or between the Resonator1 and the Radiator formed by the slot 11. For example, the positive/inductive coupling may be provided by electrically conductive through channels, grooves, apertures and/or holes, while the negative/capacitive coupling may be provided by a deep blind hole or a blind groove on the dielectric body 10.

By appropriately designing the coupling topology, the feeding network including power dividers and phase shifters in the existing AFU solution can be removed, which can sharply reduce the configuration and cost. For example, the cross-coupling between the Resonator1 and the Resonator3 or between the Resonator1 and the Radiator can play the role of power dividers and phase shifters.

FIG. 8 shows a frequency response of the AFU according to the first embodiment. It can be found that the return loss is about 20 dB and the gain is about 5 dBi in the B42 passband, whereas the attenuation is about 35 dBc in the stopband. Two transmission zeros are generated in the stopband, one on the lower side of the passband and the other on the higher side of the passband.

In the first embodiment, a third-order AFU with one radiator is illustrated. An important point in the present disclosure is that the topology of the AFU can be flexibly designed according to practical applications. This can be seen from the following description of other embodiments.

Figure 10:
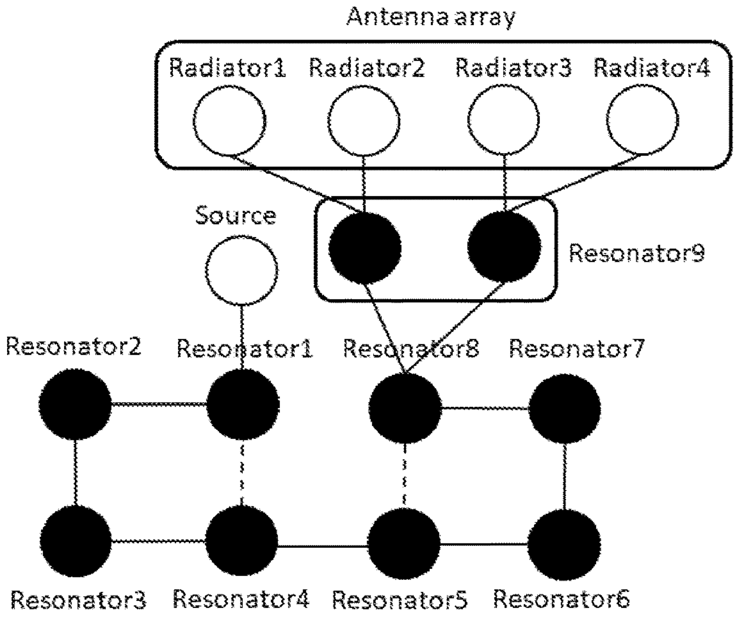
FIG. 10 shows a topology of the AFU according to the second embodiment.
Figure 11:
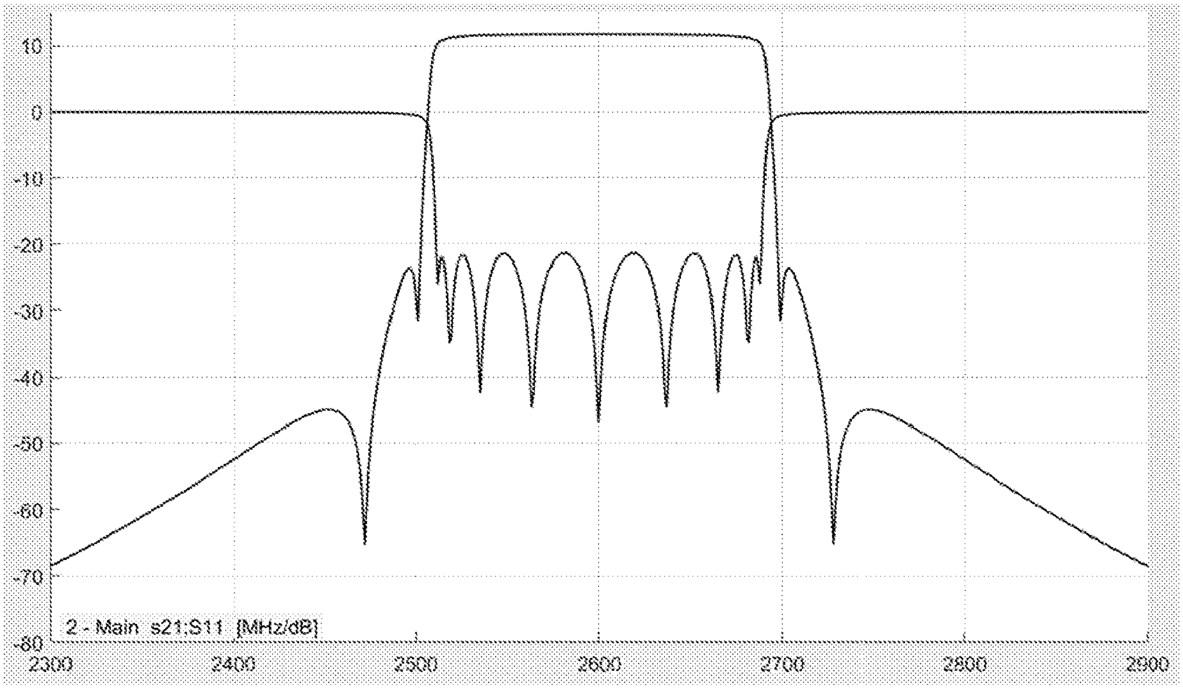
FIG. 11 shows a frequency response of the AFU according to the second embodiment.

FIGS. 9A to 9D show a perspective view, a side view, a bottom view, and a top view, respectively, of an AFU according to a second embodiment of the disclosure. FIG. 10 shows a topology of the AFU, and FIG. 11 shows a frequency response of the AFU.

As shown in FIGS. 9A to 9D, the AFU according to the second embodiment comprises a dielectric body 20 made of ceramic, for example. The dielectric body 20 may be made of another dielectric material having a high permittivity. The surfaces of the dielectric body 20 are covered with a conducting layer. The conducting layer may be a metalized layer that is formed by, for example, electroplating metal on the surfaces of the dielectric body 20. The metal may be silver, or may be another metal that satisfies a specific requirement.

The dielectric body 20 in this embodiment forms a nine-order AFU with four radiators. As illustrated, each resonator includes a blind hole 21, and each radiator is formed by a slot 22 on a top surface of the dielectric body 20. The blind hole 21 is shown to have a circular cross section; however, the cross section of the blind hole 21 may be in another shape, such as a rectangle, an ellipse, or the like. The blind hole 21 is also provided with a conducting layer, and can be used to tune a resonating frequency of a corresponding resonator. The slot 22 is formed or etched by removing a part of the conducting layer on the top surface of the dielectric body 20. As mentioned hereinabove with respect to the first embodiment, the number, shape or form, position or location, and orientation of the slot 22 can be set by those skilled in the art as needed. The four radiators, i.e., Radiator1, Radiator2, Radiator3 and Radiator4, form an antenna array.

The dielectric body 20 includes two layers, i.e., a top layer and a bottom layer. In this embodiment, the top layer and the bottom layer are spaced from each other, and are coupled to each other by two couple windows 23, as can be clearly seen from FIG. 9B. Eight resonators, i.e., Resonator1, Resonator2, . . . and Resonator8, are arranged at the bottom layer. Two other resonators, i.e., Resonator9_1 and Resonator9_2, and all the slots 22 are arranged at the top layer. Each of the Resonator9_1 and the Resonator9_2 is coupled to the Resonator8 through a corresponding couple window 23.

The dielectric body 20 is soldered on a radio board (not shown) by SMT. For this purpose, a silver clearness 24 is provided on the bottom surface of the dielectric body 20. Further, a conductor pin 25 is provided for connection between the Resonator1 and a PA on the radio board. The conductor pin 25 and the Resonator1 can serve as an impedance transformer, so that impedance matching can be easily achieved.

Like the first embodiment, in the AFU integrating a filter function and an antenna function achieved by the dielectric body 20, traditional two-piece or three-piece RF connectors between the filter unit and the antenna unit are dispensed with. The radio board may be used as an antenna reflector. Either a transmission antenna or a receiving antenna can be achieved by the slot 22, and the Resonator1 connected to the conductor pin 15 can be used as either an input resonator or an output resonator.

FIG. 10 shows a topology of the AFU according to the second embodiment in case of a transmission antenna. The solid line denotes the main coupling, i.e., a positive/inductive coupling, between the adjacent resonators (i.e., between the Resonator1 and the Resonator2, or between the Resonator2 and the Resonator3, . . . or between the Resonator8 and the Resonator9_1 or the Resonator9_2), or between the Resonator9_1 or the Resonator9_2 and a corresponding one of the four radiators (i.e., the Radiator1, the Radiator2, the Radiator3 and the Radiator4), or between the Source on the radio board and the Resonator1 as the input resonator. The dashed line denotes the cross-coupling to generate transmission zeros, i.e., a negative/capacitive coupling between the Resonator1 and the Resonator4, or between the Resonator5 and the Resonator8. For example, the positive/inductive coupling may be provided by electrically conductive through channels, grooves, apertures and/or holes, while the negative/capacitive coupling may be provided by a deep blind hole or a blind groove on the dielectric body 20.

Like the first embodiment, the cross-coupling between the Resonator1 and the Resonator4 or between the Resonator5 and the Resonator8 can play the role of power dividers and phase shifters, and the feeding network including power dividers and phase shifters in the existing AFU solution can be removed, which can sharply reduce the configuration and cost. In addition, in the second embodiment, the Radiator1 and the Radiator2 are both coupled to the Resonator9_1, the Radiator3 and the Radiator4 are both coupled to the Resonator9_2, and the Resonator9_1 and the Resonator9_2 are both coupled to the Resonator8. The coupling of the Resonator9_1 or the Resonator9_2 to the corresponding two radiators (the Radiator1 and the Radiator2; or the Radiator3 and the Radiator4) can play the role of phase shifters, and the coupling of the Resonator9_1 and the Resonator9_2 to the Resonator8 can play the role of power dividers.

FIG. 11 shows a frequency response of the AFU according to the second embodiment. It can be found that the return loss is about 20 dB and the gain is about 11 dBi in the B41K passband. Four transmission zeros are generated in the stopband, two on the lower side of the passband and the other two on the higher side of the passband.

Figure 12:
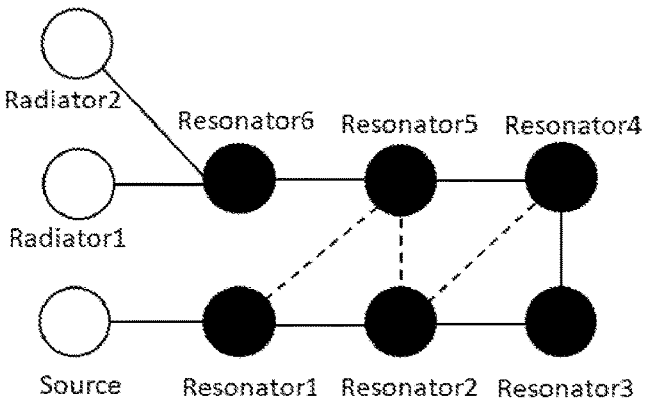
FIG. 12 shows a topology of an AFU according to a third embodiment of the disclosure.

FIG. 12 shows a topology of an AFU according to a third embodiment of the disclosure in case of a transmission antenna. The AFU in this embodiment is a sixth-order AFU with two radiators. The solid line denotes the main coupling, i.e., a positive/inductive coupling, between the adjacent resonators (i.e., between the Resonator1 and the Resonator2, or between the Resonator2 and the Resonator3, . . . or between the Resonator5 and the Resonator6), or between the Resonator6 and one of the two radiators (i.e., the Radiator1 and the Radiator2), or between the Source on the radio board and the Resonator1 as the input resonator. The dashed line denotes the cross-coupling to generate transmission zeros, i.e., a negative/capacitive coupling between the Resonator1 and the Resonator5, or between the Resonator2 and the Resonator4, or between the Resonator2 and the Resonator5.

In this embodiment, the Radiator1 and the Radiator2 are formed by two slots provided on a surface of a dielectric body, such as the two slots 11" shown in FIG. 6B. The Radiator1 and the Radiator2 are both coupled to the Resonator6, and the coupling can play the role of phase shifters.

Like in the first and second embodiment, the cross-coupling between the Resonator1 and the Resonator5, or between the Resonator2 and the Resonator4, or between the Resonator2 and the Resonator5 can also play the role of power dividers and phase shifters.

Figure 13:
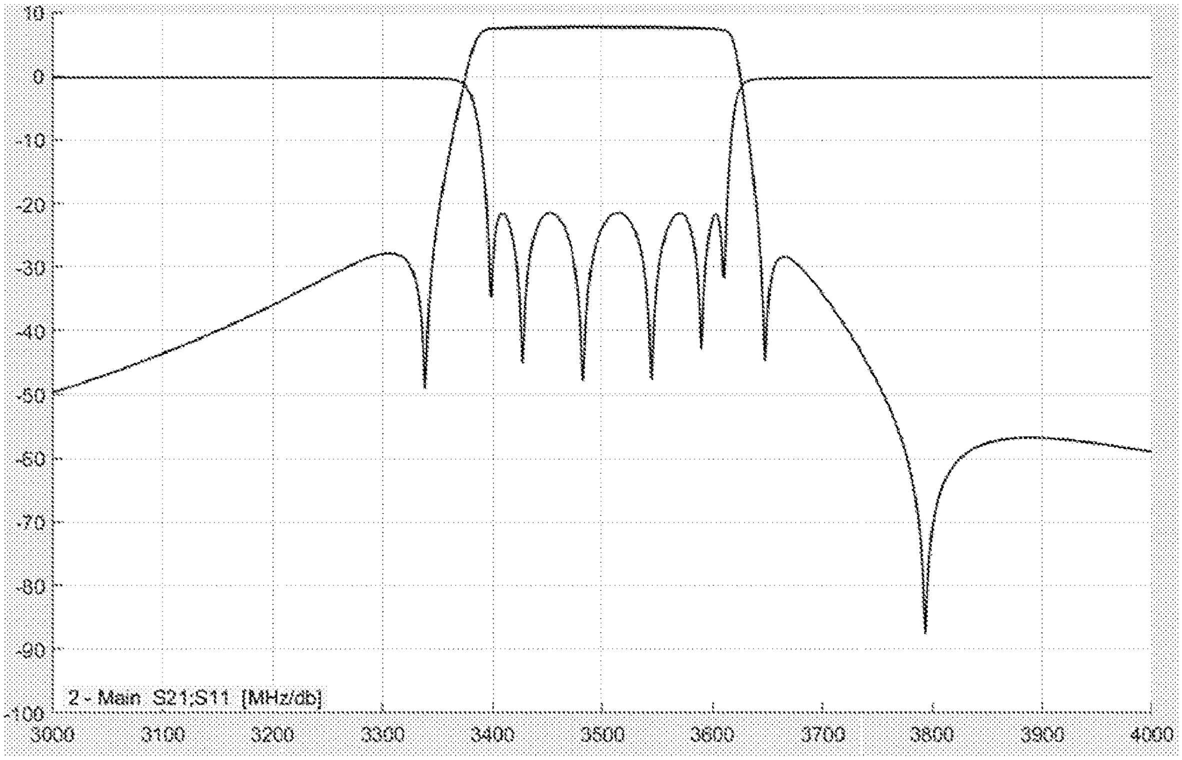
FIG. 13 shows a frequency response of the AFU according to the third embodiment.

FIG. 13 shows a frequency response of the AFU according to the third embodiment. It can be found that the return loss is about 20 dB and the gain is about 8 dBi in the B42 passband. Three transmission zeros are generated in the stopband, one on the lower side of the passband and the other two on the higher side of the passband.

Figure 14:
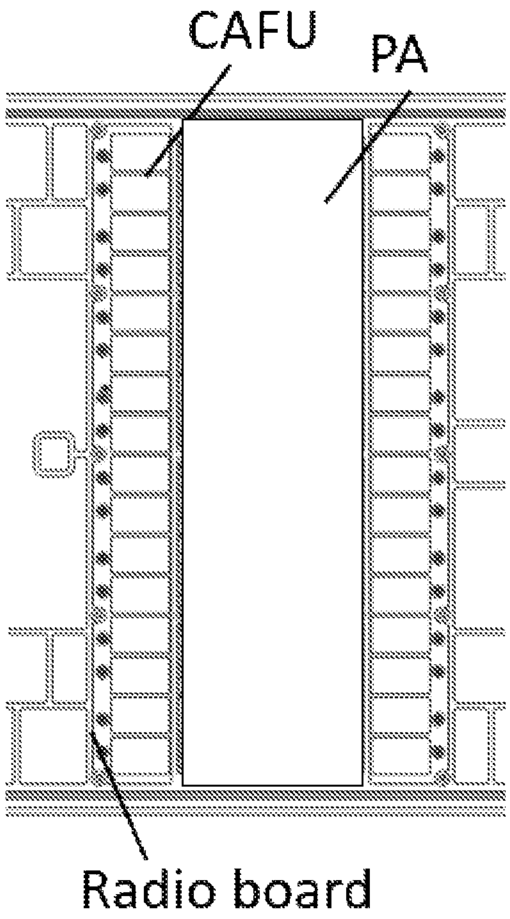
FIG. 14 is a plan view showing a part of a base station comprising an AFU according to an embodiment of the present disclosure.

The present disclosure also relates to a base station comprising an AFU as described above. FIG. 14 is a plan view showing a part of such a base station, which comprises a large number of AFUs according to an embodiment of the present disclosure. As being made of ceramic, the high-integrated AFU is also called CAFU. Each of the AFUs is soldered on a radio board by SMT. PA is also soldered on the radio board, and is connected to the AFUs. The base station may be a small cell base station, a Street Macro base station, a Street Micro base station, or an AAS base station.

In traditional solutions, filter chassis, antenna reflector board and isolation strips are three separately parts, which need to be assembled together by a large number of metal screws and plastic screws. Even in the existing AFU solution, two-piece or three-piece RF connectors between PA, filter and antenna are still necessary.

With the AFU according to the present disclosure, the antenna and the filter are integrated into one unit, and a dielectric body preferably made of ceramic are used to provide both filter and antenna function. The filter RF related performance is realized basing on ceramic block resonance, and the antenna RF related performance is realized basing on slot radiation. No traditional connector between PA, filter, and antenna are needed. Antenna reflector and isolation bar between filter and antenna in traditional solutions are also removed.

In addition, by using the coupling topology of the filter, antenna feeding network including power dividers and phase shifters is removed. Moreovr, the topology of the filter is very flexible, so that an m-order filter with n-antenna radiator can be easily achieved.

By using the AFU according to the present disclosure, radio size and weight can be reduced. Moreover, since the whole structure is simpler than traditional AFU solutions, the cost is saved, the production efficiency is improved, and the radio performance is also improved. From cost perspective, several AU parts, FU parts and RF connectors, such as power divider, phase shifter, matching network, antenna isolator, and antenna reflector, are saved than before. From performance perspective, since the connection between FU and AU and other inter connections in traditional AFU solutions are disappeared, it will benefit for PIM a lot.

References in the present disclosure to “an embodiment”, “another embodiment” and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms “first”, “second” and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term “and/or” includes any and all combinations of one or more of the associated listed terms.

The terminology used herein is for the purpose of describing particular embodiments only and is not intended to limit the present disclosure. As used herein, the singular forms “a”, “an” and “the” are intended to include the plural forms as well, unless the context clearly indicates otherwise. It will be further understood that the terms “comprises”, “comprising”, “has”, “having”, “includes” and/or “including”, when used herein, specify the presence of stated features, elements, and/or components, but do not preclude the presence or addition of one or more other features, elements, components and/or combinations thereof. The terms “connect”, “connects”, “connecting” and/or “connected” used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. An antenna filter unit (AFU), comprising a dielectric body that defines a plurality of single-mode resonators each including a tuning hole, wherein at least one slot is formed on a surface of the dielectric body to serve as an antenna radiator, and the at least one slot is coupled to at least one of the resonators.

2. The AFU according to claim 1, wherein the dielectric body is substantially covered with conducting material forming a conducting layer, and the slot is formed by removing a part of the conducting layer on the surface of the dielectric body.

3. The AFU according to claim 1, wherein the dielectric body comprises a top layer and a bottom layer with a coupling window therebetween, the at least one of the resonators and the at least one slot are arranged at the top layer of the dielectric body, and an input or output resonator is arranged at the bottom layer.

4. The AFU according to claim 3, wherein the input or output resonator serves as an impedance transformer.

5. The AFU according to claim 1, wherein there is a cross-coupling between two of the plurality of single-mode resonators, which plays the role of a power divider and a phase shifter.

6. The AFU according to claim 1, wherein the at least one slot comprises two or more slots forming an antenna array.

7. The AFU according to claim 6, wherein at least one of the plurality of single-mode resonators is coupled to two or more slots, and the coupling plays the role of a phase shifter.

8. The AFU according to claim 6, wherein a first resonator and a second resonator are coupled to one or two slots of the at least one slot respectively, the first resonator and the second resonator are both coupled to a third resonator of the plurality of single-mode resonators, and the coupling of the first and second resonators to the third resonator plays the role of a power divider.

9. The AFU according to claim 1, wherein the dielectric body is made of ceramic.

10. The AFU according to claim 1, wherein the slot is in the shape of a rectangle, or has a generally “H”, “I” or “⊔” shape.

11. A base station, comprising the AFU according to claim 1, wherein the AFU is soldered on a radio board by surface mounting technology.

12. The base station according to claim 11, wherein the base station is a small cell base station, a Street Macro base station, a Street Micro base station, or an Advanced Antenna System (AAS) base station.

* * * * *